Dec. 29, 1925.
N. C. ELLIS ET AL
1,567,718
TILTING TRAP
Filed August 4, 1922
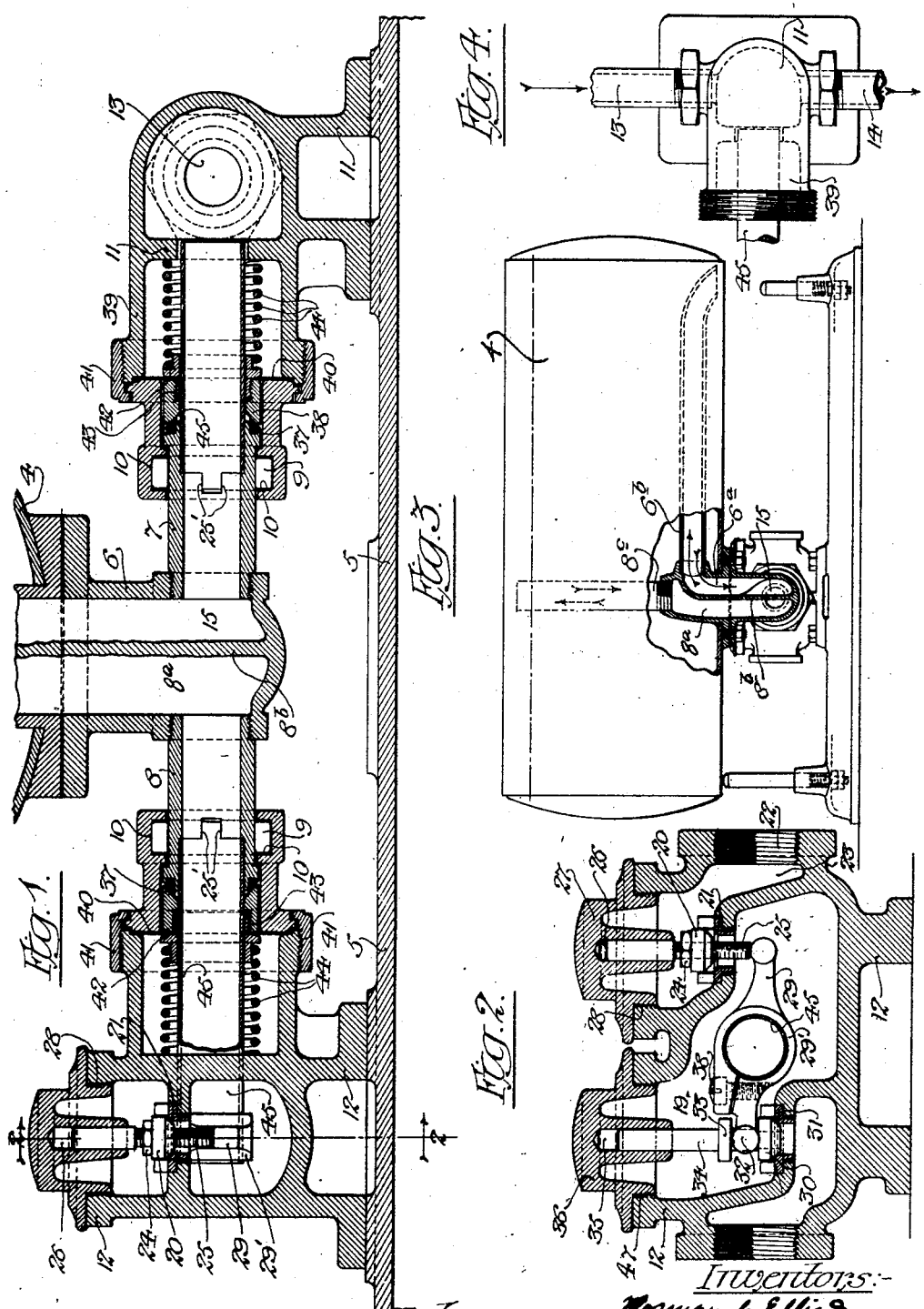

Patented Dec. 29, 1925.

1,567,718

UNITED STATES PATENT OFFICE.

NORMAN C. ELLIS AND HUBERT C. ELLIS, OF EVANSTON, ILLINOIS, ASSIGNORS TO ELLIS DRIER & ELEVATOR COMPANY, OF CHICAGO, ILLINOIS, A CORPORATION OF WISCONSIN.

TILTING TRAP.

Application filed August 4, 1922. Serial No. 579,657.

*To all whom it may concern:*

Be it known that we, NORMAN C. ELLIS and HUBERT C. ELLIS, both subjects of the King of Great Britain, and residents of Evanston, in the county of Cook and State of Illinois, have invented certain new and useful Improvements in Tilting Traps, of which the following is a full, clear, and exact description.

The invention relates to tilting traps and its objects are to provide improved means for operating a plurality of valves for controlling the flow of fluid to and from the drum and to provide improved means for maintaining a fluid-tight connection between the trunnion-pipe and fittings in which it is supported.

The invention consists in the several novel features hereinafter set forth and more particularly defined by claims at the conclusion hereof.

In the drawings: Fig. 1 is a section taken longitudinally of the trunnion-pipe of a trap embodying the invention. Fig. 2 is a section taken on line 2—2 of Fig. 1. Fig. 3 is a front view of the trap embodying the invention, reduced in size and partly in section. Fig. 4 is a plan of one of the fittings in which the trunnion pipe is supported.

The invention is exemplified in a trap which comprises a tiltable drum or tank 4 adapted to receive the condensate. The drum is secured to a trunnion pipe which is pivotally sustained and tiltably supports the drum so that when a predetermined volume of condensate has accumulated therein, the drum will be tilted in one direction to operate a controlling valve or valves to cause the condensate to be discharged and to tilt back to its normal position when it has been emptied, as well understood in the art. The trunnion-pipe comprises a central vertically extending member 6 and laterally extending members 7 and 8 secured together. The trunnion pipe is tiltably sustained by anti-friction rollers 9 in bearings 10 which are secured to fittings 11 and 12 respectively. A pipe 13 is connected to deliver condensate or fluid under pressure into one side of the fitting 11. A pipe 14 is connected to the other side of said fitting to return the condensate to the boiler. Check-valves, not shown, are included in pipes 13 and 14 respectively to prevent the backflow of fluid through them respectively. The condensate entering fitting 11 from pipe 13 passes through member 7 of the trunnion pipe, a duct 15 formed in member 6 and a fitting 6ᵃ secured in the drum and a lateral pipe 6ᵇ into the lower portion of the drum. When the condensate is put under sufficient steam-pressure, it will flow out through the same connection to discharge pipe 14, the check-valve in the delivery pipe being then closed.

A duct 8ᵃ, formed in member 6 and fitting 6ᵃ and separated from duct 15 by a wall 8ᵇ, connects the passage in member 8 with a riser pipe 8ᶜ which is sustained by said fitting and extends to a point above the water level in the drum. This connection is used to deliver live-steam under pressure to discharge the condensate into the boiler and also to vent the upper portion of the drum while it is being filled. Fitting 12, to which member 8 of the trunnion-pipe is connected, is provided with a chamber 19 which is in communication with the outer end of said member, and contains a valve 20 adapted to close against a seat 21 to control the supply of live-steam into the top of the drum to force the condensate out through trunnion-member 7, duct 6ᵃ and pipe 6ᵇ. A pipe 22 is connected to said fitting to deliver live-steam into chamber 23. Valve 20 is adjustably secured by a thread and nut 24 to a stem 25 which is slidably held in a socket 26 which is formed in a plug 27 secured to the fitting by a screw-thread 28. An arm 29, rotatable with the trunnion-pipe, is adapted to engage the lower end of the stem of valve 20 to open it when the drum is shifted to one of its alternative positions. A vent-valve 30 in chamber 19 is adapted to close against a seat 31 and is opened and closed by arm 32, which may be integrally formed with arm 29. When arm 32 is raised, it will engage a shoulder 33 on the stem 34 of valve 30. Stem 34 is slidably mounted in a socket 35 formed in a plug 36 which is secured by a screw-thread 47 in the top of fitting 12. This vent-valve is provided to permit the condensate to to enter the drum. The vent-valve is closed when valve 20 is opened to admit live steam to force the condensate from the drum. Valve-operating arms 29 and 32 are formed on a split hub which is clamped by a screw 38 to said pipe so that it may be adjusted.

A fluid-tight connection is provided between each of the members 7 and 8 of the trunnion pipe and the fittings 11 and 12 respectively. Each of these connections comprises a ring 37, which is fixed in the end of one of the members of the trunnion pipe, and has a fluid-tight surface to engage a ring 38 which is connected to a housing 39 on one of the fittings 11, 12 by a metallic diaphragm 40. The outer margin of this diaphragm is secured to said fitting by the bearing-member 10 and a flanged ring 41 which is screw-threaded to housing 39. The inner margin of the diaphragm is secured to ring 38 by a collar 42 which fits around the trunnion pipe and is connected by a screw-thread 43 to ring 38, so that the inner margin of the diaphragm will be clamped between said ring and said collar. A spring 44 in housing 39 is interposed between each fitting 12 and collar 42 to press ring 38 into contact with ring 37. The latter is formed of self-lubricating metal to minimize frictional resistance to the tilting of the trunnion-pipe whilst maintaining a fluid tight connection with ring 38. Spring 44 serves to hold the rings 37, 38 in contact, notwithstanding the expansion and contraction of the parts, resulting from temperature changes.

A section of tubing 45 fits into the outer end of each of the trunnion-pipe members 7 and 8 and is secured to rotate therewith by an interfitting connection consisting of tongues 25′, fitting into correspondingly shaped recesses in the inner periphery of one of said members. These tubes form extensions of the trunnion pipe which extend into the fittings 11′ and 12′ respectively. The arms 29 and 32 for operating valves 20 and 30 are secured to the outer end of one of these tubes. By forming these tubes or extensions separately from members 7 and 8 and so they can be separated therefrom, the self-lubricating rings 37 are rendered accessible for grinding and fitting. If it becomes necessary to regrind these rings, the tubes can be removed so that the trunnion-pipe members with rings 37 therein can be easily ground.

In operation, the fluid to be trapped, such as the condensate under pressure, will enter pipe 13 and pass through member 7 of the trunnion pipe, duct 15 and lateral pipe 6$^b$ into the drum. When the predetermined volume of condensate has entered the drum, its weight will cause it to tilt. The trunnion pipe will tilt with the drum and operate arm 32 to close the vent valve 30 and arm 29 to open the live-steam valve 20. Thereupon, live steam will pass through trunnion pipe member 8, duct 8$^a$ and pipe 8$^c$ to the top of the column of condensate in the drum. The pressure of the live steam will be sufficient to force the condensate or water back into the boiler through trunnion pipe member 7, fitting 11 and pipe 14. When the trap has been emptied, the drum will tilt back to its normal position and shift member 8 to close steam-valve 20 and open the vent-valve 30 so that the condensate may again enter the drum.

The invention exemplifies a trap in which the valve operating mechanism is operated by the trunnion-pipe and enclosed in the valve fitting; also one in which the trunnion pipe is provided with a removable section to render the rings of the fluid-tight connection accessible for grinding.

The invention is not to be understood as restricted to the details set forth, since these may be modified within the scope of the appended claims, without departing from the spirit and scope of the invention.

Having thus described the invention, what we claim as new and desire to secure by Letters Patent, is:

1. A tilting trap, the combination of a tiltable drum, a fitting, a trunnion pipe rotatable in the fitting and with the drum and having a fluid passage therein communicating with the drum, said pipe being formed of a pair of sections adapted to rotate together, a connection between the fitting and the pipe comprising a pair of rings having fluid-tight contact, one of said rings being secured to one of the pipe sections and the other of said rings being rotatable around the other pipe section, a diaphragm fixed to the said other ring and to the fitting, and a bearing in the fitting for rotatably supporting the pipe independently of the diaphragm, and a detachable connection between the pipe sections to permit separation of the sections to provide access to the ring on the said one pipe section.

2. In a tilting trap, the combination of a tiltable drum, a fitting, a trunnion pipe rotatable in the fitting and with the drum and having a fluid passage therein communicating with the drum, said pipe being formed of a pair of sections adapted to rotate together, a connection between the fitting and the pipe comprising a pair of rings having fluid-tight contact, one of said rings being secured to one of the pipe sections and the other of said rings being rotatable around the other pipe section, a diaphragm fixed to the said other ring and to the fitting, and a bearing in the fitting for rotatably supporting the pipe independently of the diaphragm, and an interfitting connection between the pipe sections which permits separation of the sections to provide access to the ring on the said one pipe section.

3. In a tilting trap, the combination of a tiltable drum, a fitting, a trunnion pipe rotatable in the fitting and with the drum and having a fluid passage therein communicating with said drum, said pipe being formed of a pair of sections adapted to rotate together and removably connected, a connection between the fitting and the pipe comprising a pair of rings having fluid-tight contact, one of said rings being secured to one of the pipe sections, a diaphragm fixed to the other ring and to the fitting, and a bearing in the fitting for rotatably supporting the pipe independently of the diaphragm, a valve for controlling the fluid, and an arm on the other of said pipe sections for shifting said valve.

Signed at Chicago, Illinois this 22nd day of July, 1922.

NORMAN C. ELLIS.
HUBERT C. ELLIS.